July 7, 1925.
C. R. HULTGREN
COMBINATION IMPLEMENT
Filed Oct. 15, 1923
1,545,188
2 Sheets-Sheet 1
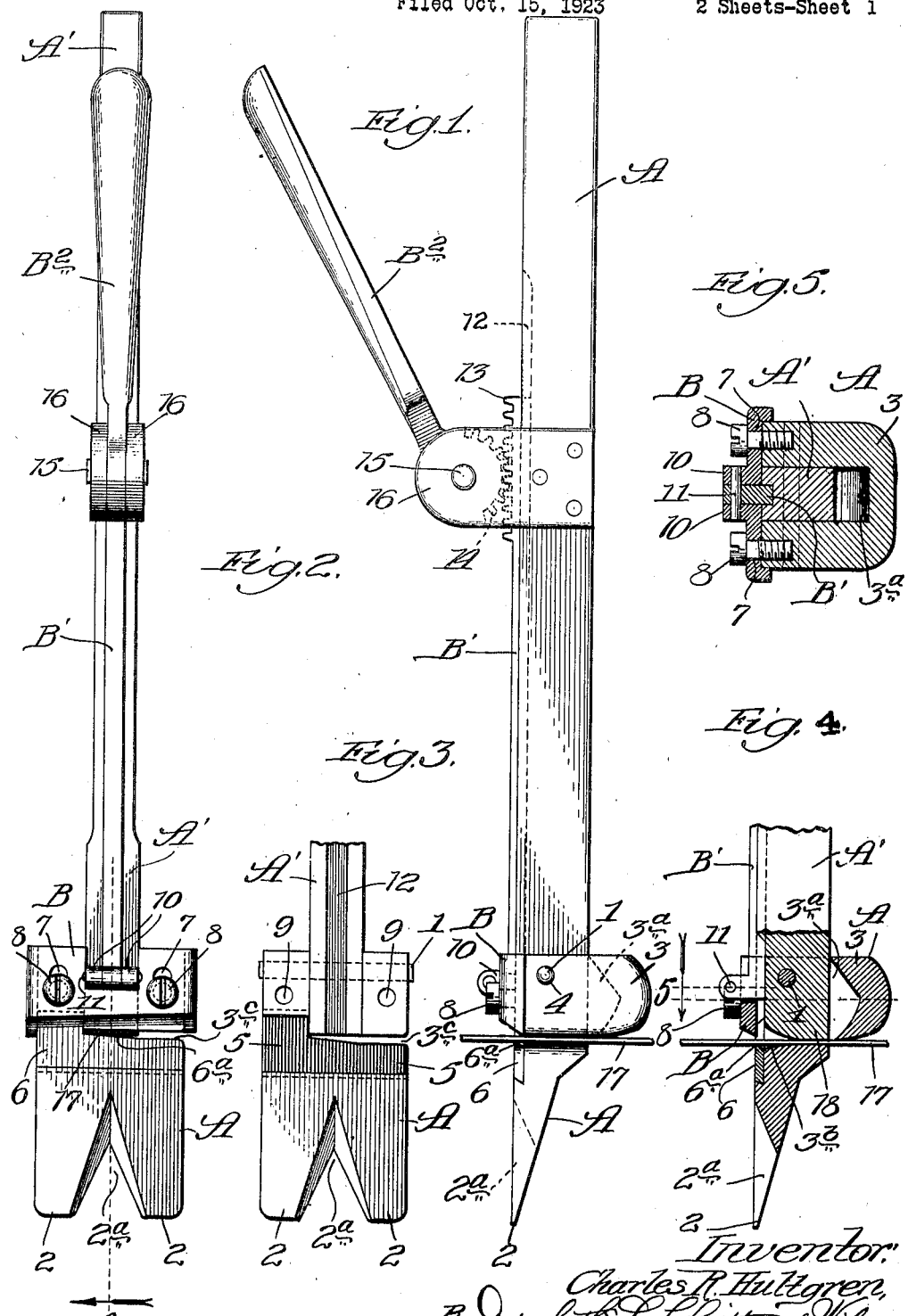

July 7, 1925. 1,545,188
C. R. HULTGREN
COMBINATION IMPLEMENT
Filed Oct. 15, 1923 2 Sheets-Sheet 2
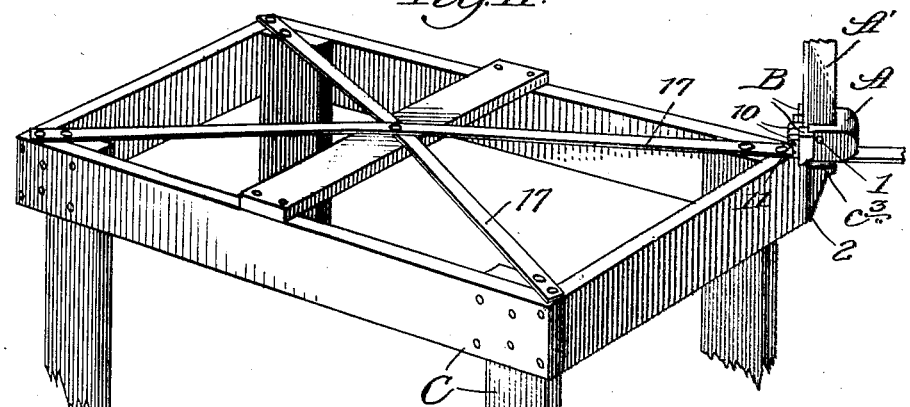
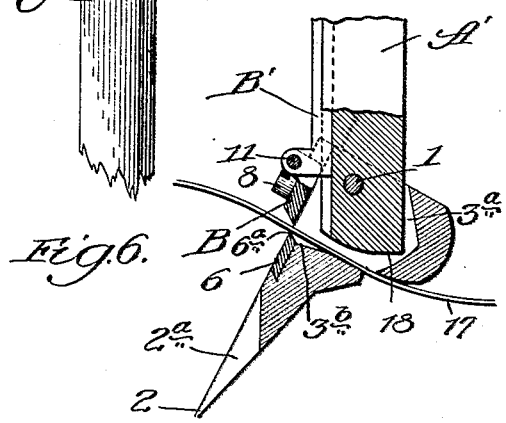
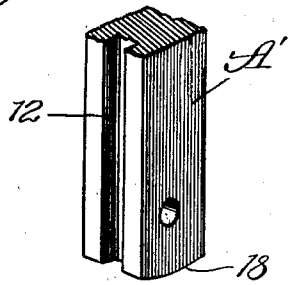
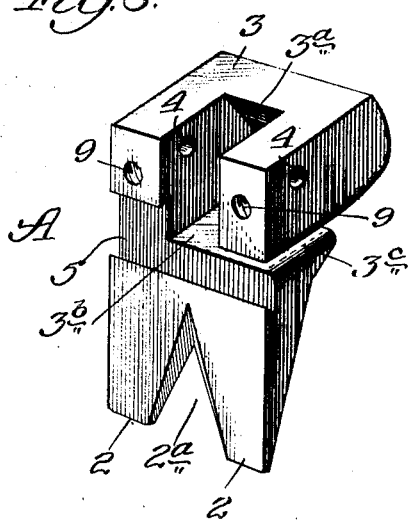
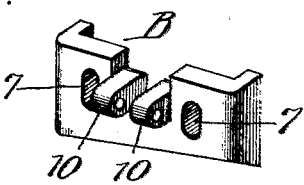
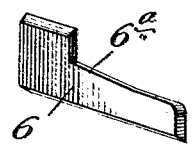
Inventor:
Charles R. Hultgren,
By Dyrenforth, Lee, Chritton and Wiles,
Attys.

Patented July 7, 1925.

1,545,188

UNITED STATES PATENT OFFICE.

CHARLES R. HULTGREN, OF CHICAGO, ILLINOIS, ASSIGNOR TO S. KARPEN & BROS., OF CHICAGO, ILLINOIS, A CORPORATION OF WEST VIRGINIA.

COMBINATION IMPLEMENT.

Application filed October 15, 1923. Serial No. 668,652.

*To all whom it may concern:*

Be it known that I, CHARLES R. HULTGREN, a citizen of the United States, residing at Chicago, in the county of Cook and State of Illinois, have invented a new and useful Improvement in Combination Implements, of which the following is a specification.

The present invention relates particularly to a device adapted for stretching metal tape or strip iron, as where it is to be applied to a crate, for example.

The primary object is to provide a device of the character indicated which is simple in construction, and which can be used with great facility.

In the preferred embodiment of the device, the implement is adapted to serve also as a nail-puller.

The invention is illustrated in its preferred embodiment in the accompanying drawings, in which—

Fig. 1 represents a side elevational view of the improved device; Fig. 2, a front elevational view of the same; Fig. 3, a broken elevational view showing the foot portion of the implement and the main lever pivotally connected therewith; Fig. 4, a broken sectional view of the device; Fig. 5, a sectional view taken as indicated at line 5 of Fig. 4; Fig. 6, a view similar to Fig. 4, but showing the condition of the device before power is applied; Fig. 7, a perspective view of a fragment of the main lever; Fig. 8, a perspective view of the foot or claw of the device; Fig. 9, a perspective view of a reciprocating shear member employed; Fig. 10, a perspective view of a stationary shear member employed; and Fig. 11, a broken perspective view of a crate, the view illustrating the manner in which the improved device, shown brokenly, is employed.

In the preferred construction which is illustrated, the device comprises a foot or claw A, a main lever A', connected with the member A by a pivot 1; and a reciprocating shear B carried by a plunger B' actuated by a lever B².

The foot A is preferably provided at its lower portion with the claws or prongs 2 which afford between them a recess 2ª. The member A is further provided at its upper portion with a block 3 which has therein a vertical slot or socket 3ª which is open at the upper and front sides. Extending through the lower portion of the block 3 from the front to rear is a horizontal channel 3ᵇ which is adapted to receive the metal tape or strand which is to be stretched. The channel 3ᵇ preferably is extended so as to be laterally open at one side through a slot 3ᶜ. This enables the metal tape to be placed into the channel 3ᵇ by a lateral movement of the tape.

The member A is provided with the perforations 4 which support the pivot 1. The front face of the member A is further provided with a dovetail groove 5, which receives a stationary shear member 6 which is provided with a shearing end 6ª.

The movable shear member B is provided with vertical slots 7 engaged by screws 8 which enter threaded holes 9 with which the front face of the block 3 is provided. The connection is such as to permit free, but limited, vertical movement of the shear member B.

The shear member B is equipped with perforated lugs 10 with which the lower end of the plunger B' is connected by a rivet or pivot 11. The member B' works in a vertical guide slot 12 with which the front face of the main lever A' is provided. The upper end of the plunger B' is equipped with a rack 13 which is engaged by a pinion segment 14 formed on the pivot portion of the lever B². The lever B² is supported on a pivot 15 carried by a bracket 16 which is rigidly secured to the lever A' at its intermediate portion.

In Fig. 1, the lever B² is shown partly swung over away from its standing position. Further movement of the lever B² toward a horizontal position serves to lift the shear member B until the bottoms of the slots 7 engage the screws 8, after which the foot A is tilted with relation to the bar A', as shown in Fig. 6. This permits the metal tape 17 to be inserted into the channel 3ᵇ. It will be noted from Fig. 6 that the lower end of the lever A' extends some distance below the pivot 1, and the extremity of the lever is provided with an eccentric surface 18 which is adapted to clamp the metal 17 against the bottom wall of the channel 3$^b$. This clamping action occurs when the lever A' is swung into alinement with the pronged foot piece A, as shown in Fig. 4.

In Fig. 11, C represents a skeleton crate having applied to one end thereof the metal strips 17. By means of the improved device, the tape can be nailed at one end, and then by means of the improved device stretched across the crate and nailed. The foot-piece of the implement may engage a corner of the crate, or any shoulder on the crate, or the prongs may be caused to dig into the wood at any point. In Fig. 11, a tape is shown brokenly beyond the implement. Ordinarily, the tape is taken from a roll (not shown), which may be located at any convenient point.

After the stretching and nailing operations, the lever B$^2$ may be swung to the vertical position, that is against the lever A', thereby forcing the shoulder member B downwardly and causing the metal to be sheared.

When desired, the implement may be used as a nail-puller, as is obvious. Also, the improved implement may be advantageously used for baling purposes, as for example where it may be desired to form bundles of wooden strips, or members of an article of furniture, such as arms, legs, etc. In such case, the metal tape may be equipped with a suitable clip and the tape caused to encircle the bundle. The implement may then be employed to draw the free end of the tape through the clip, and the clip may then be deformed so as to grip or lock the tape after it has been tightened.

The foregoing detailed description has been given for clearness of understanding only and no unnecessary limitations should be understood therefrom, but the appended claims should be construed as broadly as permissible in view of the prior art.

What I regard as new and desire to secure by Letters Patent, is:

1. An implement comprising a foot-piece having its upper portion provided with a socket and having a tape-channel at the bottom of said socket, said foot-piece being provided at its lower end with a prong, a single main lever having its lower end depending freely into said socket and provided with a cam-surface co-acting with the bottom wall of said tape-channel, and a pivot extending transversely in said socket and connecting said main lever some distance above said cam-surface with the upper portion of said foot-piece, whereby the tape will be automatically gripped between the lower extremity of said main lever and the bottom wall of the tape-channel in the operation of straightening the implement and exerting a pulling stress through the medium of said main lever.

2. An implement of the character set forth, comprising a pronged foot-piece having in its upper portion a central socket which is open at the upper surface and at the front surface of the foot-piece, a tape-channel extending through said foot-piece and having its bottom wall forming the bottom of said socket, a main lever having its lower end pivotally mounted in said socket and having a short arm depending beneath the pivot and provided with an eccentric surface adapted to clamp a tape against the bottom wall of the tape-channel when said main lever is swung substantially into the plane of the foot-piece.

3. An implement of the character set forth, comprising a pronged foot-piece having in its upper portion a central socket which is open at the upper surface and at the front surface of the foot-piece, said foot-piece being provided also with a laterally open tape-channel which intercepts the socket and whose bottom wall serves as a bottom wall for said socket, said foot-piece having also a yoke disposed back of said socket, and a main lever having its lower end portion extending into said socket and pivotally connected with the side-walls of said socket, said lever having a short arm depending beneath the pivot and terminating in an eccentric surface which co-acts with the bottom wall of the socket to clamp the tape when the implement is straightened and a pulling force is exerted through the medium of the main lever.

4. An implement of the character set forth, comprising a pronged foot-piece having its upper portion provided with a socket which is open at the upper surface and at the front surface of the foot-piece, said foot-piece being also provided with a tape-channel extending therethrough whose bottom wall forms the bottom wall of said socket, a shear shoulder at the front corner of said tape-channel, a main lever having its lower end extending into said socket and pivotally connected with the side-walls thereof and having a lower extremity affording an eccentric surface adapted to co-act with the bottom wall of the socket to grip a tape when the implement is straightened and a pulling force exerted through the medium of said main lever, a movable shear-blade mounted on said foot-piece in front of the lower portion of said main lever, a supplemental lever mounted on the main lever, and operative connections between said supplemental lever and said shear-blade.

5. An implement comprising a foot, a lever fulcrumed therein, said members having an interposed tape-channel, a cutter slidably mounted on said foot and capable of limited movement with relation thereto, and cutter-actuating means mounted on said lever, said cutter serving to tilt the foot with relation to the lever in the final portion of the upstroke.

6. An implement comprising a foot provided with a channel and a shear-member, a lever pivoted in said foot and provided with a gripper member co-acting with a wall of said channel, a shear-member mounted on and having limited movement with relation to said foot, a lever pivoted on said first-named lever and equipped with a gear-segment, and a rack meshing with said gear-segment and connected with said second-named shear-member.

CHARLES R. HULTGREN.